Aug. 6, 1935.　　　　H. W. JONES　　　　2,010,456
FLUID CLEANER
Filed Nov. 1, 1932
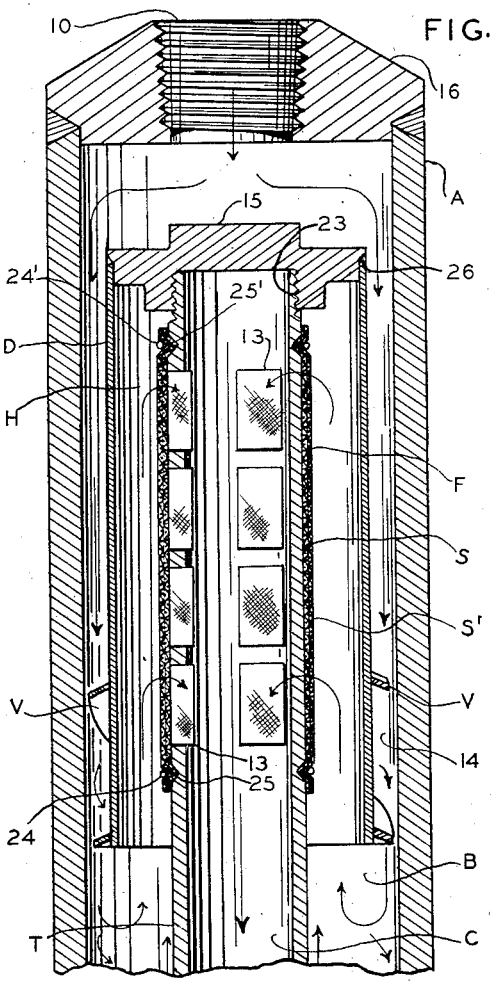
INVENTOR
HOMER W. JONES
BY
ATTORNEY Patented Aug. 6, 1935

2,010,456

UNITED STATES PATENT OFFICE 2,010,456

FLUID CLEANER

Homer W. Jones, Williamsville, N. Y., assignor to The Linde Air Products Company, a corporation of Ohio Application November 1, 1932, Serial No. 640,627

7 Claims. (Cl. 183—92)

This invention relates to an improved cleaner for separating foreign matter from fluid streams, and more particularly to a novel separator and filter for use as a cleaner in gas lines ahead of valves and pressure regulators.

Regulating and reducing valves are in general use for controlling pressures of gas. These gases often carry with them particles of grit and moisture from high pressure commercial cylinders or other sources of gas supply, which grit and moisture may score the valve seats and lodge in the valve parts, interfering with the proper operation of the regulators. Heretofore, regulating and reducing valves have usually been provided with screens for filtering the gas and catching particles of foreign matter, but such screens are not altogether satisfactory because high pressure gas and especially high velocity gas tends to force the trapped particles through the mesh of the screens.

The principal objects of the present invention are to provide an improved gas or fluid cleaner which shall be of compact and simple construction whereby it is economical to manufacture and its parts are readily accessible for inspection or repair; and which shall be effective to thoroughly clean foreign particles from the streams of gas or other fluid flowing therethrough.

The above and other objects of the novel features of this invention will be apparent from the following description and the accompanying drawing, of which:

Fig. 1 is a longitudinal sectional view illustrating a gas cleaner embodying this invention;

Fig. 2 is a side view of the baffle member, showing vanes for imparting a downward whirling motion to the gas; and Fig. 3 is a plan view of a separator plate, showing the radial fins and slots thereof.

Generally speaking, an improved cleaner embodying this invention comprises a casing provided with an inlet and an outlet, and its interior is divided into two main chambers which communicate with the inlet and the outlet, respectively. The inlet chamber may contain means to impart a whirling motion to the gas whereby the heavier foreign particles, droplets of moisture, etc., are separated from the gas by centrifugal force. The inlet chamber also may contain means whereby the direction of gas flow is reversed after such helical motion has been imparted thereto and before the gas enters the gas outlet chamber. Suitable filtering means may be provided to separate finer foreign matter from the gas, preferably after the direction of gas flow has been reversed and before the gas enters the outlet chamber; and means may also be provided in the inlet chamber whereby the greater part of the separated foreign matter may be trapped and eventually discharged from the cleaner.

As shown in Fig. 1, the preferred form of gas cleaner comprises a cylindrical casing A having axially alined inlet and outlet openings 10 and 11. The interior of this casing is divided into two main chambers B and C by a tube T which is of constant cross-sectional area throughout its length and extends nearly the full length of the inside of the casing A and is secured to and supported by the bottom of the casing in direct communication with the outlet 11 of the latter. This tube is closed at its other end, and a number of openings 13 extend through the tube near its closed end. These openings are covered with filtering material F, such as screens, to separate fine particles from the casing before the latter enters the outlet chamber C. Soon after it enters the inlet chamber B the gas is given a whirling motion by helically arranged vanes V in an annular passage 14 between the casing A and a cylindrical baffle D located in the space between the casing and the apertured part of the tubular partition T. This baffle D is secured to the periphery of an imperforate cover 15 which closes the upper end of the partition tube; and the baffle is spaced from both the casing and the tube and extends slightly below the apertured part of the tube so that the direction of flow of the gas will be reversed while passing through the cleaner. An apertured annular plate P may be located a short distance above the bottom of the inlet chamber B to provide a trap or compartment E in which to collect the heavier foreign particles and prevent them from being picked up and carried further by the gas, and from which trap the collected foreign matter may be removed occasionally through a normally closed discharge opening G.

The cylindrical casing A has an inlet cap 16 welded or otherwise secured to the upper end thereof by a gas-tight joint, which cap is provided with the internally threaded inlet opening 10. The lower end of the casing A carries an outlet cap 17 which has an externally threaded lip 18 to interfit with a similarly internally threaded portion of the casing, the end of which bears against a gasket 19 on a narrow external shoulder 20 of the cap 17. The outlet opening 11 extends centrally through the cap 17 axially in line with the opening 10 and is threaded at its outer end for connection to the gas line. The inner end of the outlet passage 11 is provided with threads 21 to receive the externally threaded end 22 of the tube T, whereby the latter is rigidly supported axially within the casing A.

The upper end of the tube T is closed by the cover 15 which has a threaded recess 23 to fit the externally threaded upper end of the tube. For a substantial distance downward from its closed end, the tube T is cut away at numerous points to provide a latticed wall thereby forming the openings 13. The total area of these openings is relatively large in order to offer no resistance to the passage of gas into the outlet chamber C when these openings are covered by the filtering material F. The filtering material F may consist of two superposed screens S, S' which are supported at numerous points by the crossbars of the latticed part of the tube T, to prevent the collapse of the filter when it has become loaded with particles after long service. The screen S may be of fine mesh wire closely fitting the wall of the tube, and the screen S' may be of relatively coarser mesh wire to protect and cover the screen S. These screens may be wrapped around the tube, the vertical or overlapped edges thereof soldered together and at either end wires 24, 24' may extend over the screens above grooves 25, 25' in the tube, binding the screens tightly to the latter. Portions of the screens are thus pressed into the circumferential grooves 25, 25' by the twisted wires, so as to provide a tight joint and prevent the screens from slipping endwise.

The cylindrical baffle D has its upper end welded or otherwise tightly secured in an annular depression 26 in the periphery of the cover 15, whereby this baffle is spaced between the inner wall of the casing and the screened section of the tube T. The baffle D extends a short distance below the screened section so that the full force of the entering gas will not be directed against the screens. The vanes V are preferably secured to the outer wall of the baffle near its lower end and impart a centrifugal motion to the gas entering through the annular passage 14. For this purpose the vanes may be helically arranged on the outer surface of the baffle and so soldered or otherwise secured thereto. It is preferred to use relatively short narrow strips of metal of a width allowing a close fit between the baffle and the inner wall of the casing A. The lower end of each strip or vane overlaps the upper end of the succeeding vane so that the incoming gas must strike an appreciable length of each of the vanes before passing beyond the baffle. The outer edges of the vanes are tilted downward, making an acute angle with the extended radii and the cylindrical surface of the baffle. This slight tilting of the vanes tends to impart an additional outward motion to the down flowing gas. The annular entrapping plate P may be secured to the wall of the tube T a short distance from the bottom of the chamber B and has its outer edge closely fitting the inner wall of the casing A, thereby providing the trap or compartment E. A number of approximately radial tongues or fins 27 are punched from the upper side of the plate P leaving corresponding slots 28 through which gas is deflected into the trap E by the fins 27. These deflectors are bent at an angle to the horizontal plane and incline upward in a direction opposite to that of the whirling motion of the gas imparted by the vanes V. The discharge opening G is provided for convenience in cleaning out the inside of the casing A and the trap E, and comprises an inclined drilling extended through the bottom cap 17 inside the lip 18. A removable plug 29 may be employed to close off the outer end of this opening.

In operation the gas cleaner separates foreign particles and droplets of moisture from the gas in the following manner: Gas, from a cylinder of compressed gas or other supply, enters at the top through the inlet 10, flows downward around the baffle D at a relatively high velocity and is rotated by the vanes, imparting a centrifugal force to the foreign matter, throwing the same out against the casing A and downward into the chamber B. The direction of flow of part of the gas reverses when it reaches the lower end of the baffle, throwing down foreign matter and entering the space H between the baffle and screened part of the tube at a decreased velocity. Other currents of gas flow outwardly and downwardly near the inner wall of the casing A, carrying foreign matter with them against the fins 27 and through the slots 28 into the trap E. The gas continues to whirl in the trap E keeping the heavier particles away from the center. However, this gas tends to move upward along the wall of the tube T and to carry some of the foreign matter out through the slots 28, but the fins tend to prevent this since their inclination is such that, upon coming into contact with the underside of the fins, such particles are forced back into the trap E. Consequently, all but the very light particles are retained in the trap under the plate P. Some of the lighter particles continue upward with the gas and are caught by the screens S, S'. The gas which passes out through the tube T and the outlet 11 is therefore free from foreign matter and thoroughly clean.

The combined area of the openings 13 in the upper end of the tube T is relatively large, whereby the velocity of the gas passing through each aperture of the screens is materially reduced which greatly minimizes the possibility of the gas forcing particles of foreign matter through the filter. Moreover, the filter is supported at many points by the crossbars of the latticed part of the tube T, which prevents a collapse of the filter when it becomes loaded with particles of foreign matter.

The trap E may be cleaned by removing the plug 29 and allowing the force of the whirling gas under the plate P to blow the accumulated grit out through the cleaning hole G. When it becomes necessary to inspect or repair the cleaner or to clean the screens S, S' after long service, the tube T may be readily removed from the casing A and unscrewed from the cover 15.

While the improved cleaner is especially adapted for removing foreign matter from a gas stream, some or all of the features thereof may also be utilized in separating foreign matter from other fluids. Although a preferred form of the improved cleaner has been described in detail, it should be understood that changes may be made in the form shown without departing from the scope of this invention.

I claim:

1. In a gas cleaner, the combination of a tubular casing provided with an inlet and an outlet at opposite ends of the casing and axially alined therewith; a tubular wall dividing the casing into two main communicating chambers, the lower end of said wall being secured to and supported by the bottom of said casing and communicating directly with said outlet; a cover detachably secured to and closing the upper end of said wall, said wall having a plurality of apertures therethrough near its closed end, said wall being continuous except for the apertures therein; an imperforate tubular baffle secured to and closed at one end by said cover, said baffle being spaced from the inside of said casing and from the apertured portion of said wall, the open end of said baffle being below the apertured portion of said wall; vanes in the space between said baffle and casing; a trap at the bottom of the outer chamber for foreign matter; and means for filtering all the gas before it passes through the casing outlet.

2. In a fluid cleaner, the combination of a casing having enclosing end members provided with inlet and outlet openings in substantially axial alignment for passing fluid therethrough; means arranged in said casing for dividing the interior thereof into two main communicating chambers one surrounding the other; said dividing means having filtering means associated therewith the outer chamber communicating with the inlet and the inner chamber communicating with the outlet and having the end thereof adjacent to the inlet spaced therefrom; means including a baffle member and a plurality of vanes arranged in the outer chamber for causing the fluid admitted therein to whirl and separate foreign matter carried thereby by centrifugal force and for reversing the direction of flow of all of the fluid after it is caused to whirl; said dividing means having apertures therein adjacent its end nearest to the inlet of said cleaner and said filtering means being disposed and arranged to cover the apertures in said dividing means for filtering the fluid after such reversal and before passing through the outlet opening.

3. In a fluid cleaner, the combination of a tubular casing provided with an inlet and an outlet at opposite ends thereof; a tubular wall dividing the interior of said casing into two main communicating chambers, the lower end of said wall being secured to and supported by said casing so as to communicate with said outlet; a cover secured to and closing the upper end of said wall, said wall having a plurality of apertures therethrough near its closed end; a tubular baffle secured to and closed at one end by said cover, said baffle being spaced from said wall and from the inside of said casing and extending beyond the apertured portion of said wall; means in the inlet chamber for imparting a whirling motion to the fluid; means for trapping foreign matter separated from the fluid; and means for filtering all of the fluid before it leaves the casing outlet.

4. In a fluid cleaner the combination of a tubular casing provided with an inlet and an outlet; a tubular wall dividing the interior of said casing into two main coaxial chambers, the outer of which communicates with said inlet and the inner with said outlet; one end of said tubular wall being secured to said casing adjacent said outlet, said wall having its other end closed and lateral apertures therein adjacent such closed end, said wall being continuous except for the lateral apertures therein; filter material covering the apertures; and an imperforate tubular baffle extending coaxially of the tubular wall and surrounding the apertured portion thereof and spaced from said tubular wall and from the inner wall of the casing, said tubular baffle being closed at one end adjacent the closed end of said wall and open at the opposite end thereof.

5. In a fluid cleaner the combination of a tubular casing provided with an inlet and an outlet; a tubular wall dividing the interior of said casing into two main coaxial chambers, the outer of which communicates with said inlet and the inner with said outlet; one end of said tubular wall being secured to said casing adjacent said outlet, said wall having its other end closed and lateral apertures therein adjacent such closed end, said wall being continuous except for the lateral apertures therein; filter material covering the apertures; an imperforate tubular baffle extending coaxially of the tubular wall and surrounding the apertured portion thereof and spaced from said tubular wall and from the inner wall of the casing, said tubular baffle being closed at one end adjacent the closed end of said wall and open at the opposite end thereof; and means in the annular space between said baffle and said casing for imparting a whirling motion to the fluid stream.

6. In a fluid cleaner the combination of a tubular casing provided with an inlet and an outlet; a tubular wall dividing the interior of said casing into two main coaxial chambers, the outer of which communicates with said inlet and the inner with said outlet; one end of said tubular wall being secured to said casing adjacent said outlet, said wall having its other end closed and lateral apertures therein adjacent such closed end, said wall being continuous except for the lateral apertures therein; filter material covering the apertures; an imperforate tubular baffle extending coaxially of the tubular wall and surrounding the apertured portion thereof and spaced from said tubular wall and from the inner wall of the casing, said tubular baffle being closed at one end adjacent the closed end of said wall and open at the opposite end thereof; and a grit trap at the bottom of the outer chamber.

7. In a fluid cleaner the combination of a tubular casing provided with an inlet and an outlet; a tubular wall dividing the interior of said casing into two main coaxial chambers, the outer of which communicates with said inlet and the inner with said outlet; one end of said tubular wall being secured to said casing adjacent said outlet, said wall having its other end closed and lateral apertures therein adjacent such closed end, said wall being continuous except for the lateral apertures therein; filter material covering the apertures; an imperforate tubular baffle extending coaxially of the tubular wall and surrounding the apertured portion thereof and spaced from said tubular wall and from the inner wall of the casing, said tubular baffle being closed at one end adjacent the closed end of said wall and open at the opposite end thereof; and a grit trap comprising an annular apertured plate spaced from the bottom of the outer chamber and extending substantially the entire distance between the outer surface of the tubular wall and the inner wall of said casing.

HOMER W. JONES.